Nov. 19, 1935. M. C. PETERS 2,021,463
COMBINED GROUP EQUALIZING AND INDIVIDUALLY OPERATING HYDRAULIC BRAKE
Filed Jan. 28, 1935
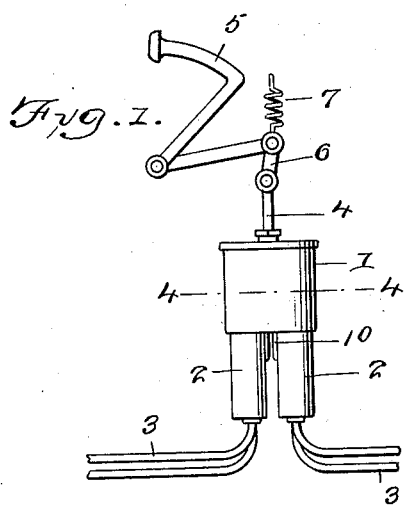
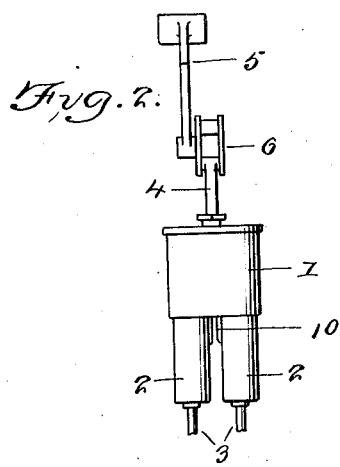
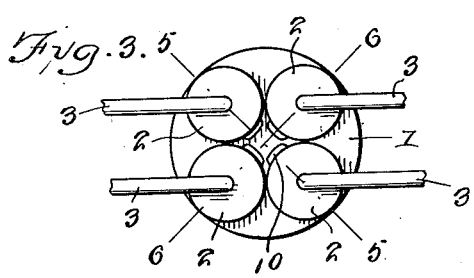
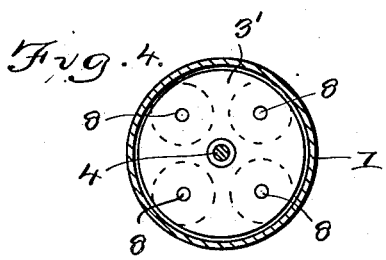
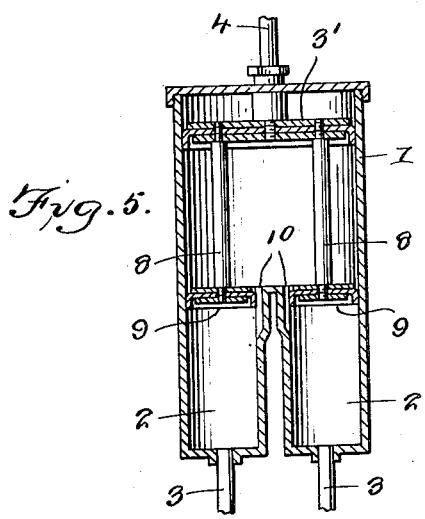
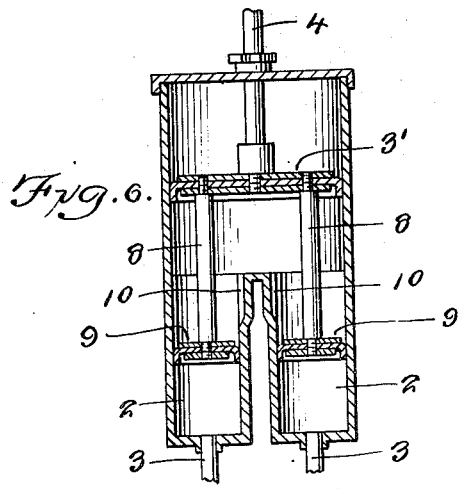
M. C. Peters INVENTOR
BY Victor J. Evans & Co.
ATTORNEY Patented Nov. 19, 1935

2,021,463

UNITED STATES PATENT OFFICE 2,021,463

COMBINED GROUP EQUALIZING AND INDIVIDUALLY OPERATING HYDRAULIC BRAKE

Maurice Coulter Peters, Bennington, Vt.

Application January 28, 1935, Serial No. 3,860

2 Claims. (Cl. 60—54.6)

This invention relates to hydraulic brakes and more particularly to a combined safety and equalizing medium therefor, and has for the primary object the provision of a device of the above stated character which may be readily adapted to a hydraulic brake system and which will under normal operating conditions of said brake system maintain equalization of fluid pressure to the brake shoe operating mechanisms of said system and in case of a leak or injury to one or more of the brake shoe operating mechanisms, the undamaged brake operating mechanism will be maintained in efficient operating condition to obviate inoperativeness of the entire brake system should a defect or leak occur in said system.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation, illustrating a combined safety and equalizing medium for a hydraulic brake system and taking the place of the usual master cylinder and pistons of said system and constructed in accordance with my invention.

Figure 2 is a view taken at right angles to Figure 1, illustrating the device.

Figure 3 is a bottom plan view illustrating the device.

Figure 4 is a sectional view taken on the line 4—4 of Figure 1.

Figure 5 is a sectional view taken on the line 5—5 of Figure 3.

Figure 6 is a sectional view taken on the line 6—6 of Figure 3.

My invention is connected to a hydraulic brake system of a motor vehicle or like device in lieu of the usual master cylinder and master piston and consists of a vertically arranged master cylinder 1 and has formed integrally with the bottom thereof subcylinders 2, the lower ends of which are connected to the pipes 3 leading to the brake operating mechanisms (not shown) of the hydraulic brake system. Each brake operating mechanism is connected to a subcylinder.

A master piston 3' operates in the master cylinder 1 and the stem 4 thereof is pivotally connected to a brake pedal 5 by a link 6. A spring 7 is connected to the brake pedal and acts to position the latter in non-brake applying position.

Stems 8 are secured to the piston 3' and extend into the subcylinders 2 and have secured thereto pistons 9 operating in the subcylinders. Bypasses 10 are provided between the subcylinders 2 and the master cylinder 1. The bypasses are formed in the walls of the subcylinders at the mouths of the latter and extend a limited distance in the direction of the lower ends of the subcylinders.

When the hydraulic brake system is in normal operating condition, the pistons described occupy the positions in the cylinders, as shown in Figure 5, when the brake pedal is in non-brake applying position so that an equalization of fluid pressure may be had throughout the entire brake system. The brake pedal 5 is depressd as usual to apply the brakes, causing a downward movement of the pistons, which movement under normal conditions is comparatively short so that the pistons may displace the fluid of the master and subcylinders to the brake operating mechanisms, the bypasses still maintaining communication between the master cylinder and the subcylinders. However, should a leak or defect occur in any one of the brake operating mechanisms as to cause a loss of liquid, the cylinder 1 is drained permitting the pistons to move further downwardly in the cylinders and as the pistons 9 move downwardly beyond the bypasses 10, the communication between the brake operating mechanisms is interrupted, placing each brake operating mechanism under fluid pressure from its respective subcylinder. Thus it will be seen that the undamaged brake operating mechanism remains in efficient operating condition to bring about braking action upon the vehicle or like device sufficient to meet with emergency requirement.

Having described the invention, I claim:

1. A device of the character set forth comprising a master cylinder, a master piston operating in said cylinder, an operating means connected to said piston, subcylinders formed integrally with and in direct communication with said master cylinder and each connected to a brake operating mechanism of a hydraulic brake system, subpistons operating in the subcylinders, means providing positive connection between the subpistons and the master piston to be operated thereby, and means between the master cylinder and the subcylinders to permit communication between the master cylinder and each subcylinder during certain positions of the pistons and to close the subcylinders to the master cylinder and to each other during other positions of the pistons.

2. A device of the character set forth comprising a master cylinder, a master piston operating in said cylinder, an operating means connected to said piston, subcylinders connected to said master cylinder and each connected to a brake operating mechanism of a hydraulic brake system, subpistons operating in the subcylinders and connected to the master piston to be operated thereby, said subcylinders having by-passes in the walls thereof for a limited distance and connected with the master cylinder to permit communication between the master cylinder and each subcylinder during certain positions of the subpistons and to close the subcylinders to the master cylinder and to each other during other positions of the subpistons.

MAURICE COULTER PETERS.